(12) United States Patent
Miller et al.

(10) Patent No.: US 9,791,351 B2
(45) Date of Patent: **\*Oct. 17, 2017**

(54) GAS TURBINE COMBUSTION PROFILE MONITORING

(71) Applicant: General Electric Company, Schenectady, NY (US)

(72) Inventors: Karen Warren Miller, Atlanta, GA (US); Lijie Yu, Atlanta, GA (US); Robert Iasillo, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 342 days.

This patent is subject to a terminal disclaimer.

(21) Appl. No.: 14/616,105

(22) Filed: Feb. 6, 2015

(65) Prior Publication Data

US 2016/0231199 A1 Aug. 11, 2016

(51) Int. Cl.
*G01M 15/14* (2006.01)
*F02C 9/00* (2006.01)
*F02C 3/04* (2006.01)

(52) U.S. Cl.
CPC ............... *G01M 15/14* (2013.01); *F02C 3/04* (2013.01); *F02C 9/00* (2013.01); *F05D 2260/80* (2013.01); *F05D 2260/83* (2013.01); *F05D 2270/0831* (2013.01)

(58) Field of Classification Search
CPC .. G01M 15/14; F02C 9/00; F02C 3/04; F05D 2270/0831; F05D 2260/80; F05D 2260/83
USPC ...................................................... 73/112.01
See application file for complete search history.

(56) References Cited

U.S. PATENT DOCUMENTS

| | | | |
|---|---|---|---|
| 3,775,745 A | 11/1973 | Kelley | |
| 3,892,975 A | 7/1975 | Yannone et al. | |
| 3,911,285 A | 10/1975 | Yannone et al. | |
| 3,924,141 A | 12/1975 | Yannone et al. | |
| 3,943,371 A | 3/1976 | Yannone et al. | |
| 3,943,373 A | 3/1976 | Yannone et al. | |
| 3,955,359 A | 5/1976 | Yannone et al. | |

(Continued)

FOREIGN PATENT DOCUMENTS

| | | |
|---|---|---|
| EP | 0427952 A1 | 5/1991 |
| EP | 0651138 A1 | 5/1995 |

(Continued)

*Primary Examiner* — Daniel S Larkin
*Assistant Examiner* — Anthony W Megna Fuentes
(74) *Attorney, Agent, or Firm* — Eversheds Sutherland (US) LLP

(57) ABSTRACT

Systems and methods for gas turbine combustion profile monitoring are disclosed. In one embodiment, a method for detecting an anomaly in a combustion section of a gas turbine is disclosed. The method includes receiving, from a plurality of thermal sensors disposed around an exhaust section of a gas turbine, exhaust profile data of the gas turbine. The method further analyzes the exhaust profile data to calculate statistical features associated with a peak-trough pattern. The method further determines, using a machine learning algorithm, that the statistical features are abnormal. In response to the determination, the method processes the exhaust profile data for a predetermined period of time and reports an anomaly in a combustion section of the gas turbine if the statistical features remain abnormal for the predetermined period of time.

20 Claims, 6 Drawing Sheets

(56) References Cited

U.S. PATENT DOCUMENTS

| | | |
|---|---|---|
| 4,019,315 A | 4/1977 | Yannone et al. |
| 4,051,669 A | 10/1977 | Yannone et al. |
| 4,058,975 A | 11/1977 | Gilbert et al. |
| 4,115,998 A | 9/1978 | Gilbert et al. |
| 4,117,670 A | 10/1978 | Dombkowsi et al. |
| 4,208,591 A | 6/1980 | Yannone et al. |
| 4,242,592 A | 12/1980 | Yannone et al. |
| 4,283,634 A | 8/1981 | Yannone et al. |
| 4,314,441 A | 2/1982 | Yannone et al. |
| 4,430,046 A | 2/1984 | Cirrito |
| 4,578,756 A | 3/1986 | Rosenbush et al. |
| 4,609,328 A | 9/1986 | Cirrito |
| 4,700,542 A | 10/1987 | Wang |
| 5,024,055 A | 6/1991 | Sato et al. |
| 5,058,537 A | 10/1991 | Paul et al. |
| 5,148,667 A | 9/1992 | Morey |
| 5,212,943 A | 5/1993 | Harris |
| 5,257,496 A | 11/1993 | Brown et al. |
| 5,303,684 A | 4/1994 | Brown et al. |
| 5,404,760 A | 4/1995 | Robinson et al. |
| 5,423,175 A | 6/1995 | Beebe et al. |
| 5,480,298 A | 1/1996 | Brown |
| 5,487,266 A | 1/1996 | Brown |
| 5,617,718 A | 4/1997 | Althaus |
| 5,720,165 A | 2/1998 | Rizzie et al. |
| 5,748,500 A | 5/1998 | Quentin et al. |
| 5,845,481 A | 12/1998 | Briesch et al. |
| 5,867,977 A | 2/1999 | Zachary et al. |
| 5,878,566 A | 3/1999 | Endo et al. |
| 5,930,990 A | 8/1999 | Zachary et al. |
| 5,957,063 A | 9/1999 | Koseki et al. |
| 6,003,296 A | 12/1999 | Citeno et al. |
| 6,095,793 A | 8/2000 | Greeb |
| 6,116,016 A | 9/2000 | Wada et al. |
| 6,155,212 A | 12/2000 | McAlister |
| 6,173,564 B1 | 1/2001 | Zachary |
| 6,244,034 B1 | 6/2001 | Taylor et al. |
| 6,260,350 B1 | 7/2001 | Horii et al. |
| 6,289,666 B1 | 9/2001 | Ginter |
| 6,306,532 B1 | 10/2001 | Kurita et al. |
| 6,405,522 B1 | 6/2002 | Pont et al. |
| 6,485,296 B1 | 11/2002 | Bender et al. |
| 6,530,210 B2 | 3/2003 | Horii et al. |
| 6,554,088 B2 | 4/2003 | Severinsky et al. |
| 6,564,556 B2 | 5/2003 | Ginter |
| 6,568,167 B2 | 5/2003 | Utamura et al. |
| 6,568,168 B2 | 5/2003 | Horii et al. |
| 6,640,199 B1 | 10/2003 | Goldstein et al. |
| 6,642,720 B2 | 11/2003 | Maylotte et al. |
| 6,705,074 B2 | 3/2004 | Horii et al. |
| 6,711,888 B2 | 3/2004 | Horii et al. |
| 6,722,135 B2 | 4/2004 | Davis, Jr. et al. |
| 6,744,503 B2 | 6/2004 | Vo-Dinh et al. |
| 6,779,332 B2 | 8/2004 | Horii et al. |
| 6,782,691 B2 | 8/2004 | Nagata et al. |
| 6,796,129 B2 | 9/2004 | Yee et al. |
| 6,810,655 B2 | 11/2004 | Davis, Jr. et al. |
| 6,848,419 B1 | 2/2005 | Donaldson |
| 6,853,959 B2 | 2/2005 | Ikeda et al. |
| 6,868,663 B2 | 3/2005 | Nagata et al. |
| 6,912,856 B2 | 7/2005 | Morgan et al. |
| 6,931,856 B2 | 8/2005 | Belokon et al. |
| 6,945,030 B2 | 9/2005 | Hirayama et al. |
| RE38,831 E | 10/2005 | Horii et al. |
| 6,962,043 B2 | 11/2005 | Venkateswaran et al. |
| 6,999,903 B2 | 2/2006 | Ikeda et al. |
| 7,032,388 B2 | 4/2006 | Healy |
| RE39,092 E | 5/2006 | Horii et al. |
| 7,040,083 B2 | 5/2006 | Horii et al. |
| 7,052,737 B2 | 5/2006 | Kool et al. |
| 7,076,940 B2 | 7/2006 | Hirayama et al. |
| 7,100,357 B2 | 9/2006 | Morgan et al. |
| 7,104,347 B2 | 9/2006 | Severinsky et al. |
| 7,117,662 B2 | 10/2006 | Hirayama et al. |
| 7,121,097 B2 | 10/2006 | Yee et al. |
| 7,124,589 B2 | 10/2006 | Neary |
| 7,127,898 B2 | 10/2006 | Healy |
| 7,140,186 B2 | 11/2006 | Venkateswaran et al. |
| 7,152,409 B2 | 12/2006 | Yee et al. |
| 7,210,297 B2 | 5/2007 | Shah et al |
| 7,237,634 B2 | 7/2007 | Severinsky et al. |
| 7,246,002 B2 | 7/2007 | Healy et al. |
| 7,302,334 B2 | 11/2007 | Hook et al. |
| 7,310,950 B2 | 12/2007 | Dovali-Solis et al. |
| 7,320,213 B2 | 1/2008 | Shah et al. |
| 7,340,129 B2 | 3/2008 | Yalin et al. |
| 7,368,827 B2 | 5/2008 | Kulkarni et al. |
| 7,392,871 B2 | 7/2008 | Severinsky et al. |
| 7,416,137 B2 | 8/2008 | Hagen et al. |
| 7,420,662 B2 | 9/2008 | Yalin et al. |
| 7,455,134 B2 | 11/2008 | Severinsky et al. |
| 7,461,510 B1 | 12/2008 | Munson, Jr. |
| 7,497,220 B2 | 3/2009 | Asplund et al. |
| 7,513,100 B2 | 4/2009 | Motter et al. |
| 7,520,353 B2 | 4/2009 | Severinsky et al. |
| 7,523,603 B2 | 4/2009 | Hagen et al. |
| 7,559,388 B2 | 7/2009 | Severinsky et al. |
| 7,565,805 B2 | 7/2009 | Steber et al. |
| 7,582,359 B2 | 9/2009 | Sabol et al. |
| 7,593,803 B2 | 9/2009 | Healy et al. |
| 7,597,164 B2 | 10/2009 | Severinsky et al. |
| 7,618,712 B2 | 11/2009 | Sabol et al. |
| 7,734,443 B2 | 6/2010 | De et al. |
| 7,742,904 B2 | 6/2010 | Healy et al. |
| 7,788,901 B2 | 9/2010 | Huang |
| 7,808,118 B2 | 10/2010 | Berkson |
| 7,815,743 B2 | 10/2010 | Asplund et al. |
| 7,822,512 B2 | 10/2010 | Thatcher et al. |
| 7,966,802 B2 | 6/2011 | Szepek et al. |
| 7,980,082 B2 | 7/2011 | Ziminsky et al. |
| 7,997,083 B2 | 8/2011 | Meadows et al. |
| 8,004,423 B2 | 8/2011 | Mitchell et al. |
| 8,126,629 B2 | 2/2012 | Buchalter et al. |
| RE43,252 E | 3/2012 | Ginter |
| 8,136,740 B2 | 3/2012 | Hagen et al. |
| 8,192,688 B2 | 6/2012 | Hagen et al. |
| 8,214,097 B2 | 7/2012 | Severinsky et al. |
| 8,265,851 B2 | 9/2012 | Girouard et al. |
| 8,280,647 B2 | 10/2012 | Stadler et al. |
| 8,297,265 B2 | 10/2012 | McAlister et al. |
| 8,370,044 B2 | 2/2013 | Dean et al. |
| 8,402,755 B2 | 3/2013 | Sengar et al. |
| 8,423,161 B2 | 4/2013 | Wilkes et al. |
| 8,434,311 B2 | 5/2013 | Zhang et al. |
| 8,437,941 B2 | 5/2013 | Chandler |
| 8,452,515 B2 | 5/2013 | Drohan et al. |
| 8,474,268 B2 | 7/2013 | Fuller et al. |
| 8,479,754 B2 | 7/2013 | Hjerpe |
| 8,510,060 B2 | 8/2013 | Hardwicke et al. |
| 2001/0022078 A1 | 9/2001 | Horii et al. |
| 2001/0039230 A1 | 11/2001 | Severinsky et al. |
| 2001/0056335 A1 | 12/2001 | Ikeda et al. |
| 2002/0099476 A1 | 7/2002 | Hamrin et al. |
| 2002/0129609 A1 | 9/2002 | Pont et al. |
| 2002/0139105 A1 | 10/2002 | Horii et al. |
| 2002/0148229 A1 | 10/2002 | Pont et al. |
| 2002/0149485 A1 | 10/2002 | Nagata et al. |
| 2003/0014958 A1 | 1/2003 | Horii et al. |
| 2003/0014959 A1 | 1/2003 | Ginter |
| 2003/0014978 A1 | 1/2003 | Horii et al. |
| 2003/0019202 A1 | 1/2003 | Horii et al. |
| 2003/0020480 A1 | 1/2003 | Maylotte et al. |
| 2003/0117619 A1 | 6/2003 | Vo-Dinh et al. |
| 2003/0217876 A1 | 11/2003 | Severinsky et al. |
| 2004/0011056 A1 | 1/2004 | Yee et al. |
| 2004/0055273 A1 | 3/2004 | Hirayama et al. |
| 2004/0093850 A1 | 5/2004 | Horii et al. |
| 2004/0096314 A1 | 5/2004 | Kool et al. |
| 2004/0119291 A1 | 6/2004 | Hamrin et al. |
| 2004/0148940 A1 | 8/2004 | Venkateswaran et al. |
| 2004/0182067 A1 | 9/2004 | Nagata et al. |
| 2004/0206090 A1 | 10/2004 | Yee et al. |
| 2004/0206091 A1 | 10/2004 | Yee et al. |
| 2004/0219079 A1 | 11/2004 | Hagen et al. |

(56) References Cited

U.S. PATENT DOCUMENTS

| | | |
|---|---|---|
| 2004/0238654 A1 | 12/2004 | Hagen et al. |
| 2004/0255595 A1 | 12/2004 | Morgan et al. |
| 2004/0255596 A1 | 12/2004 | Horii et al. |
| 2005/0022536 A1 | 2/2005 | Dovali-Solis et al. |
| 2005/0056021 A1 | 3/2005 | Belokon et al. |
| 2005/0107941 A1 | 5/2005 | Healy |
| 2005/0114010 A1 | 5/2005 | Healy et al. |
| 2005/0131656 A1 | 6/2005 | Ikeda et al. |
| 2005/0132713 A1 | 6/2005 | Neary |
| 2005/0198967 A1 | 9/2005 | Subramanian |
| 2005/0204745 A1 | 9/2005 | Hirayama et al. |
| 2005/0257514 A1 | 11/2005 | Morgan et al. |
| 2006/0032471 A1 | 2/2006 | Yalin et al. |
| 2006/0037572 A1 | 2/2006 | Yalin et al. |
| 2006/0048796 A1 | 3/2006 | Asplund et al. |
| 2006/0056959 A1 | 3/2006 | Sabol et al. |
| 2006/0056960 A1 | 3/2006 | Sabol et al. |
| 2006/0064986 A1 | 3/2006 | Ginter et al. |
| 2006/0080965 A1 | 4/2006 | Healy |
| 2006/0090471 A1 | 5/2006 | Shah et al. |
| 2006/0100057 A1 | 5/2006 | Severinsky et al. |
| 2006/0201132 A1 | 9/2006 | Hirayama et al. |
| 2006/0201158 A1 | 9/2006 | Venkateswaran et al. |
| 2006/0231304 A1 | 10/2006 | Severinsky et al. |
| 2006/0231305 A1 | 10/2006 | Severinsky et al. |
| 2006/0231306 A1 | 10/2006 | Severinsky et al. |
| 2006/0237246 A1 | 10/2006 | Severinsky et al. |
| 2006/0237247 A1 | 10/2006 | Severinsky et al. |
| 2007/0073525 A1 | 3/2007 | Healy et al. |
| 2007/0089425 A1* | 4/2007 | Motter ............... F02C 3/30 60/775 |
| 2007/0113560 A1 | 5/2007 | Steber et al. |
| 2007/0157620 A1 | 7/2007 | Healy et al. |
| 2007/0199299 A1 | 8/2007 | Kashmerick |
| 2007/0199328 A1 | 8/2007 | Shah et al. |
| 2007/0234702 A1 | 10/2007 | Hagen et al. |
| 2007/0278795 A1 | 12/2007 | Berkson |
| 2008/0040872 A1 | 2/2008 | Hjerpe |
| 2008/0054645 A1 | 3/2008 | Kulkarni et al. |
| 2008/0078178 A1 | 4/2008 | Johnson |
| 2008/0098746 A1* | 5/2008 | Iasillo ............... F02C 3/22 60/776 |
| 2008/0196391 A1 | 8/2008 | Huang |
| 2008/0314035 A1 | 12/2008 | Evan-Beauchamp |
| 2009/0031731 A1 | 2/2009 | Ziminsky et al. |
| 2009/0044513 A1 | 2/2009 | Fuller et al. |
| 2009/0055070 A1 | 2/2009 | De et al. |
| 2009/0063003 A1 | 3/2009 | Meadows et al. |
| 2009/0071166 A1 | 3/2009 | Hagen et al. |
| 2009/0104484 A1 | 4/2009 | Fujimura et al. |
| 2009/0173078 A1 | 7/2009 | Thatcher et al. |
| 2009/0177345 A1 | 7/2009 | Severinsky et al. |
| 2009/0180939 A1 | 7/2009 | Hagen et al. |
| 2009/0193788 A1 | 8/2009 | Szepek et al. |
| 2009/0260660 A1 | 10/2009 | Asplund et al. |
| 2009/0271085 A1 | 10/2009 | Buchalter et al. |
| 2009/0281737 A1 | 11/2009 | Stadler et al. |
| 2010/0024379 A1 | 2/2010 | Sengar et al. |
| 2010/0049417 A1 | 2/2010 | Bailey et al. |
| 2010/0050652 A1 | 3/2010 | Skipper |
| 2010/0117859 A1 | 5/2010 | Mitchell et al. |
| 2010/0226756 A1 | 9/2010 | Mitchell et al. |
| 2010/0292906 A1 | 11/2010 | Girouard et al. |
| 2010/0300110 A1 | 12/2010 | Kraemer et al. |
| 2010/0332103 A1 | 12/2010 | Dean et al. |
| 2011/0004363 A1 | 1/2011 | Severinsky et al. |
| 2011/0094241 A1 | 4/2011 | Rodd et al. |
| 2011/0184602 A1 | 7/2011 | Severinsky et al. |
| 2011/0190971 A1 | 8/2011 | Severinsky et al. |
| 2011/0225976 A1 | 9/2011 | Ziminsky et al. |
| 2011/0296810 A1 | 12/2011 | Hardwicke et al. |
| 2011/0296844 A1 | 12/2011 | Widener et al. |
| 2012/0000403 A1 | 1/2012 | Taplin, Jr. |
| 2012/0002035 A1 | 1/2012 | Li et al. |
| 2012/0006032 A1 | 1/2012 | Kopcho et al. |
| 2012/0023953 A1 | 2/2012 | Thomas et al. |
| 2012/0036862 A1 | 2/2012 | Rabiei et al. |
| 2012/0037100 A1 | 2/2012 | McAlister et al. |
| 2012/0060510 A1 | 3/2012 | Badami et al. |
| 2012/0072194 A1 | 3/2012 | Arnold et al. |
| 2012/0102914 A1 | 5/2012 | Kirzhner et al. |
| 2012/0103283 A1 | 5/2012 | Mehring et al. |
| 2012/0150413 A1 | 6/2012 | Bunce et al. |
| 2012/0283963 A1 | 11/2012 | Mitchell et al. |
| 2013/0006581 A1 | 1/2013 | Singh et al. |
| 2013/0042624 A1* | 2/2013 | Botarelli ............... F02C 9/00 60/772 |
| 2013/0054031 A1 | 2/2013 | Wilkes et al. |
| 2013/0066615 A1 | 3/2013 | Morgan et al. |
| 2013/0073170 A1 | 3/2013 | Drohan et al. |
| 2013/0074515 A1 | 3/2013 | Widener |
| 2013/0096752 A1 | 4/2013 | Severinsky et al. |
| 2013/0096753 A1 | 4/2013 | Severinsky et al. |
| 2013/0104846 A1 | 5/2013 | McAlister |
| 2013/0125554 A1 | 5/2013 | Mittricker et al. |
| 2013/0125555 A1 | 5/2013 | Mittricker et al. |
| 2013/0145748 A1 | 6/2013 | Shimizu et al. |
| 2013/0180260 A1 | 7/2013 | Romig et al. |
| 2014/0069085 A1* | 3/2014 | Alm ............... F02D 41/16 60/274 |
| 2014/0257666 A1* | 9/2014 | Abrol ............... F02C 9/48 701/100 |
| 2014/0260288 A1* | 9/2014 | D'Amato ............... F02C 9/00 60/772 |
| 2015/0176437 A1* | 6/2015 | Tobo ............... F01K 23/101 60/778 |

FOREIGN PATENT DOCUMENTS

| | | |
|---|---|---|
| EP | 0677706 A1 | 10/1995 |
| EP | 0837231 A2 | 4/1998 |
| EP | 0945606 A2 | 9/1999 |
| EP | 1108870 A2 | 6/2001 |
| EP | 1168130 A1 | 1/2002 |
| EP | 0898645 B1 | 10/2002 |
| EP | 1251258 A2 | 10/2002 |
| EP | 1283339 A1 | 2/2003 |
| EP | 0829683 B1 | 8/2003 |
| EP | 1420234 A1 | 5/2004 |
| EP | 1062409 B1 | 7/2004 |
| EP | 1113943 B1 | 11/2004 |
| EP | 0889212 B1 | 12/2004 |
| EP | 1496220 A2 | 1/2005 |
| EP | 1522450 A2 | 4/2005 |
| EP | 1531243 A2 | 5/2005 |
| EP | 1533573 A1 | 5/2005 |
| EP | 1522450 A3 | 6/2005 |
| EP | 1531243 A3 | 7/2005 |
| EP | 1114279 B1 | 12/2005 |
| EP | 1556598 B1 | 9/2006 |
| EP | 1788309 A2 | 5/2007 |
| EP | 1427965 B1 | 12/2007 |
| EP | 1755952 B1 | 12/2007 |
| EP | 1881178 A2 | 1/2008 |
| EP | 1897806 A2 | 3/2008 |
| EP | 1944547 A1 | 7/2008 |
| EP | 2025902 A2 | 2/2009 |
| EP | 2088288 A2 | 8/2009 |
| EP | 2112572 A2 | 10/2009 |
| EP | 1930568 B1 | 7/2010 |
| EP | 1715964 B1 | 8/2010 |
| EP | 2213845 A1 | 8/2010 |
| EP | 2263809 A2 | 12/2010 |
| EP | 2289750 A1 | 3/2011 |
| EP | 2104802 B1 | 8/2011 |
| EP | 1932704 B1 | 10/2011 |
| EP | 2392797 A2 | 12/2011 |
| EP | 2423489 A2 | 2/2012 |
| EP | 2434127 A2 | 3/2012 |
| EP | 2450551 A2 | 5/2012 |
| EP | 2083153 B1 | 10/2012 |
| EP | 1445450 B1 | 11/2012 |
| EP | 1662113 B1 | 11/2012 |

(56) References Cited

FOREIGN PATENT DOCUMENTS

| | | |
|---|---|---|
| EP | 1668234 B1 | 11/2012 |
| EP | 2549081 A1 | 1/2013 |
| EP | 2562612 A1 | 2/2013 |
| EP | 2570616 A2 | 3/2013 |
| EP | 2570877 A1 | 3/2013 |
| EP | 2573359 A2 | 3/2013 |
| EP | 2031192 B1 | 6/2013 |
| EP | 2610472 A1 | 7/2013 |
| EP | 2617964 A2 | 7/2013 |
| EP | 2494156 B1 | 8/2013 |
| EP | 2534347 B1 | 5/2016 |
| WO | 95/27845 A1 | 10/1995 |
| WO | 97/43530 A1 | 11/1997 |
| WO | 98/32960 A1 | 7/1998 |
| WO | 98/46863 A1 | 10/1998 |
| WO | 98/46869 A1 | 10/1998 |
| WO | 99/46484 A1 | 9/1999 |
| WO | 00/15455 A2 | 3/2000 |
| WO | 00/17577 A1 | 3/2000 |
| WO | 01/40644 A1 | 6/2001 |
| WO | 02/068867 A2 | 9/2002 |
| WO | 02/078987 A2 | 10/2002 |
| WO | 03/021150 A2 | 3/2003 |
| WO | 03/029741 A1 | 4/2003 |
| WO | 03/072919 A1 | 9/2003 |
| WO | 2004/042844 A2 | 5/2004 |
| WO | 2004/064990 A2 | 8/2004 |
| WO | 2004/065763 A2 | 8/2004 |
| WO | 2004/065777 A2 | 8/2004 |
| WO | 2005/028832 A1 | 3/2005 |
| WO | 2005/077554 A1 | 8/2005 |
| WO | 2005/120953 A1 | 12/2005 |
| WO | 2006/007056 A1 | 1/2006 |
| WO | 2007/011361 A2 | 1/2007 |
| WO | 2008/027607 A1 | 3/2008 |
| WO | 2008/030325 A1 | 3/2008 |
| WO | 2008/045396 A2 | 4/2008 |
| WO | 2008/068330 A1 | 6/2008 |
| WO | 2008/087126 A1 | 7/2008 |
| WO | 2008/091289 A2 | 7/2008 |
| WO | 2008/150839 A1 | 12/2008 |
| WO | 2010/024945 A1 | 3/2010 |
| WO | 2010/025132 A1 | 3/2010 |
| WO | 2010/123411 A1 | 10/2010 |
| WO | 2011/056193 A2 | 5/2011 |
| WO | 2011/056360 A1 | 5/2011 |
| WO | 2011/100717 A2 | 8/2011 |
| WO | 2012/003005 A2 | 1/2012 |
| WO | 2012/003489 A2 | 1/2012 |
| WO | 2012/018457 A1 | 2/2012 |
| WO | 2012/018458 A1 | 2/2012 |
| WO | 2012/151150 A1 | 11/2012 |
| WO | 2013/025651 A1 | 2/2013 |

* cited by examiner

GAS TURBINE COMBUSTION PROFILE MONITORING

TECHNICAL FIELD

The disclosure relates to the art of turbomachines, and, more particularly, to systems and methods of gas turbine combustion profile monitoring.

BACKGROUND

Turbomachines can include a compressor portion linked to a turbine portion through a common compressor/turbine shaft and a combustor assembly. An inlet airflow can pass through an air intake toward the compressor portion. In the compressor portion, the inlet airflow can be compressed through a number of sequential stages toward the combustor assembly. In the combustor assembly, the compressed airflow can mix with fuel to form a combustible mixture. The combustible mixture can be combusted in the combustor assembly to form hot gases. The hot gases can be guided along a hot gas path of the turbine portion through a transition piece. The hot gases can expand along a hot gas path through a number of turbine stages acting upon turbine bucket airfoils mounted on wheels to create work that is output, for example, to power a generator. The hot gases can pass from the turbine portion through an exhaust system as exhaust gases. A number of thermocouples can be arranged in the exhaust system to measure temperatures of the exhaust gases.

The temperatures of the exhaust gases measured by the thermocouples can form an exhaust profile. The exhaust profile can be used to assess the health of combustion hardware. Certain hardware issues may cause a combustor to run unusually hot or cold, which can disrupt the typical exhaust profile. An atypical exhaust profile pattern may indicate an abnormal operation of one or more combustors. The typical exhaust profile for some turbomachines is uniform, where the individual exhaust thermocouples deviate only slightly from the mean. For such turbomachines, detection of combustion hardware anomalies can be performed by identifying thermocouple groups that deviate significantly from the mean. Other turbomachines may have an exhaust profile that has a peak-trough pattern during normal operation. Typically, a number of peaks and a number of troughs in the peak-trough pattern correspond to the number of combustors of the turbomachine. The approach described above may not be effective at detecting combustion anomalies for turbomachines with a peak-trough pattern since the peak-trough profile pattern may be treated as abnormal deviations from the mean.

SUMMARY OF THE DISCLOSURE

This disclosure relates to systems and methods for gas turbine combustion profile monitoring. Certain embodiments can facilitate detecting an anomaly in a combustion section of a gas turbine. According to one embodiment of the disclosure, a method for detecting an anomaly in a combustion section of a gas turbine includes receiving, by at least one processor, from a plurality of thermal sensors disposed around an exhaust section of a gas turbine, the exhaust profile data of the gas turbine. The method may further include analyzing the exhaust profile data to calculate statistical features associated with a peak-trough pattern. The method may facilitate determination, using a machine learning algorithm, that the statistical features are abnormal. The method may further include, in response to the determination, processing the exhaust profile data for a predetermined period of time and reporting an anomaly in a combustion section of the gas turbine if the statistical features remain abnormal for the predetermined period of time.

According to another embodiment of the disclosure, a system for detecting an anomaly in a combustion section of a gas turbine is provided. The system may include a plurality of combustors associated with a combustion section and a plurality of thermal sensors disposed around an exhaust section of a gas turbine. The thermal sensors are configured to provide exhaust profile data of the gas turbine. The system further includes a processing circuit communicatively coupled to a memory, with the memory storing instructions which, when executed by the processing circuit, perform operations.

Other embodiments, systems, methods, features, and aspects will become apparent from the following description taken in conjunction with the following drawings.

DETAILED DESCRIPTION

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

Certain embodiments of the disclosure concern methods and systems for gas turbine combustion profile monitoring which can facilitate detecting an anomaly in a combustion section of a gas turbine. The disclosed methods and systems may also provide for determining a non-uniform temperature profile during operation of a gas turbine.

In some example embodiments of the disclosure, a processing circuit may receive, from a plurality of thermal sensors disposed around an exhaust section of a gas turbine, the exhaust profile data of the gas turbine. The exhaust profile data can be analyzed to calculate statistical features associated with a peak-trough pattern. The analysis may include identifying, based on the exhaust profile data, a peak-trough couple associated with each thermal sensor and calculating the statistical features for each peak-trough couple. The processing circuit may further determine, using a machine learning algorithm, that the statistical features are abnormal. In response to the determination, processing the exhaust profile data may continue for a predetermined period of time. If the statistical features remain abnormal for the predetermined period of time, an anomaly in a combustion section of the gas turbine may be reported.

Technical effects of certain embodiments of the disclosure may include combustion monitoring of gas turbines. Further technical effects of certain embodiments of the disclosure may increase the probability of detecting combustion anomalies in gas turbines before the combustion anomalies may result in significant events or hardware failures. The disclosed embodiments of the disclosure may provide insight in the combustion health of the gas turbines to reduce combustion related trips, forced outage time, and unplanned costs.

The following provides the detailed description of various example embodiments related to systems and methods for operational impact modeling using statistical and physics-based methodologies.

Figure 1:
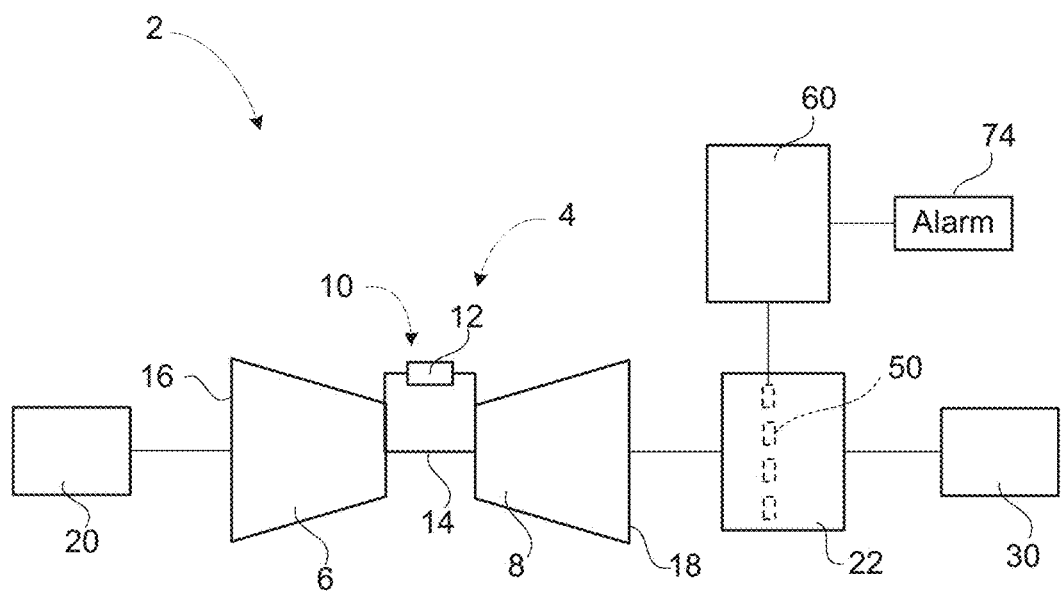
FIG. 1 is a block diagram of an example gas turbine, according to an embodiment of the disclosure.

A gas turbomachine system, in accordance with an example embodiment of the disclosure, is illustrated generally at 2, in FIG. 1. Gas turbomachine system 2 may include a gas turbomachine 4 having a compressor portion 6 fluidically connected to a turbine portion 8 through a combustor assembly 10. Combustor assembly 10 may include one or more combustors 12, which may be arranged in a can-annular array. Compressor portion 6 may also be mechanically linked to turbine portion 8 through a shaft 14. Compressor portion 6 may include an air inlet 16 and turbine portion 8 may include an exhaust outlet 18. An air intake system 20 may be fluidically connected to air inlet 16. Air intake system 20 may condition air passing into compressor portion 6. For example, air intake system 20 may remove or reduce moisture that may be carried by air passing into air inlet 16. An exhaust system 22 may be fluidically connected to exhaust outlet 18. Exhaust system 22 may condition exhaust gases passing from turbine portion 8 prior to introduction to an environment. Exhaust system 22 may include a plurality of temperature sensors 50. Gas turbomachine system 2 may also include a driven load 30 that could take the form of a generator, a pump, or a vehicle. The gas turbomachine system 2 may further include a combustor anomaly detection system 60 that may be operatively connected to an alarm 74.

Figure 2:
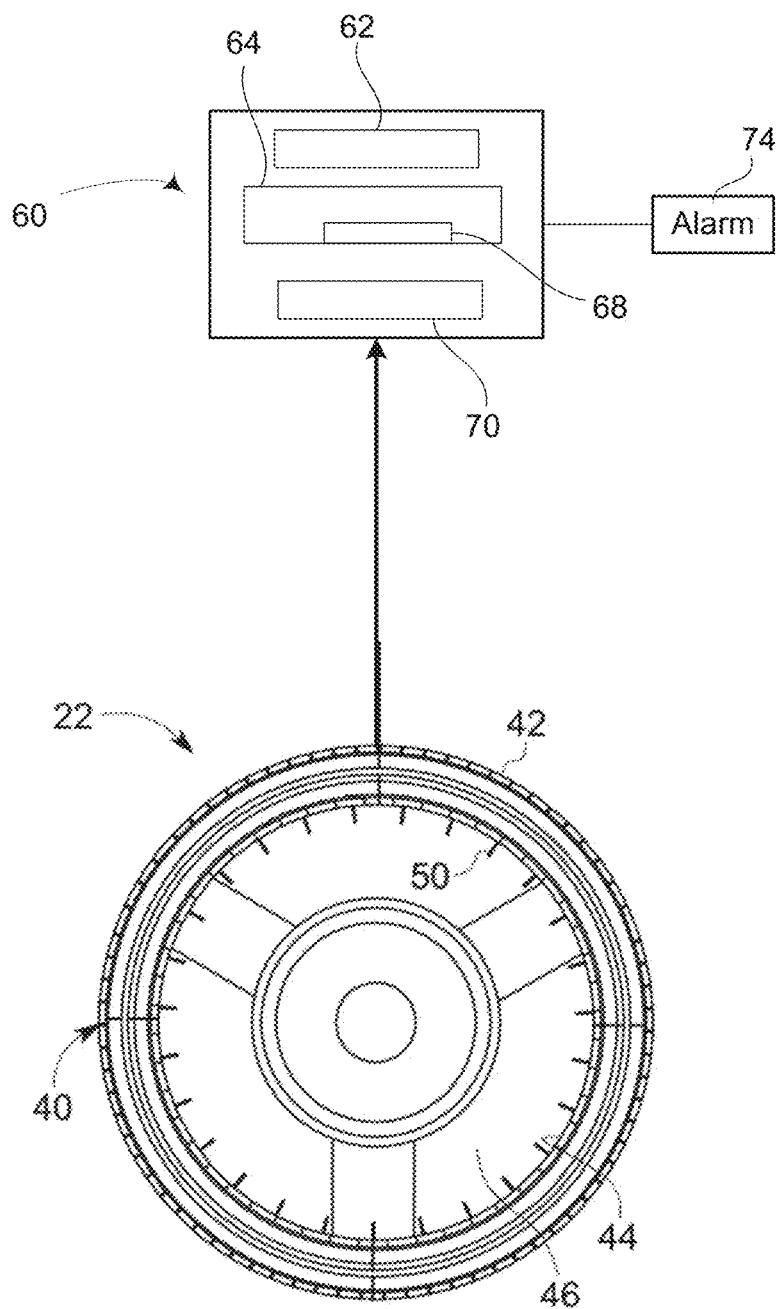
FIG. 2 is an axial view of an example exhaust system of a gas turbine and a combustion anomaly detection system, according to an embodiment of the disclosure.

As shown in FIG. 2, exhaust system 22 may include a housing 40 having an outer surface 42 and an inner surface 44 that defines an exhaust gas flow path 46. Exhaust system 22 may include a plurality of temperature sensors, one of which is indicated at 50, arranged on housing 40. Temperature sensors 50 may take the form of thermocouples that are circumferentially arrayed about inner surface 44 and exposed to exhaust gas flow path 46. In accordance with an embodiment of the disclosure, the combustor anomaly detection system 60 is operatively connected to each of the plurality of temperature sensors 50. It should be understood that combustor anomaly detection system 60 may be co-located with gas turbomachine 4, may be integrated into the turbine controller, or may be in a central global monitoring station. Thus, combustor anomaly detection system 60 may receive data from and simultaneously monitor multiple gas turbomachine systems located anywhere in the world from a single monitoring location. Combustor anomaly detection system 60 may include a central processing unit (CPU) 62, and a computer readable storage medium 64 provided with a set of program instructions 68 and a memory 70. As will be discussed in more detail below, combustor anomaly detection system 60 may be operatively connected to an alarm 74 that may provide a visual and/or an audible alarm upon detecting a combustion anomaly.

Figure 3B:
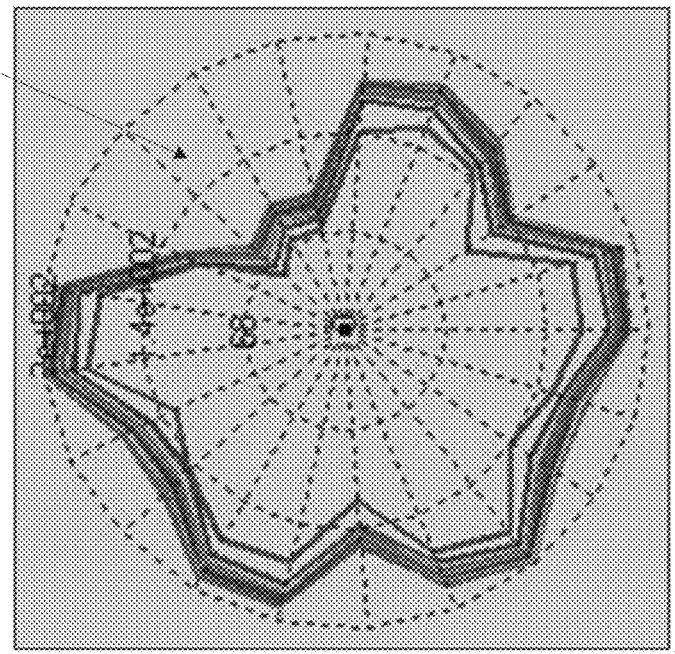
FIG. 3B is an abnormal profile of the thermocouple exhaust data, according to an embodiment of the disclosure.
Figure 3A:
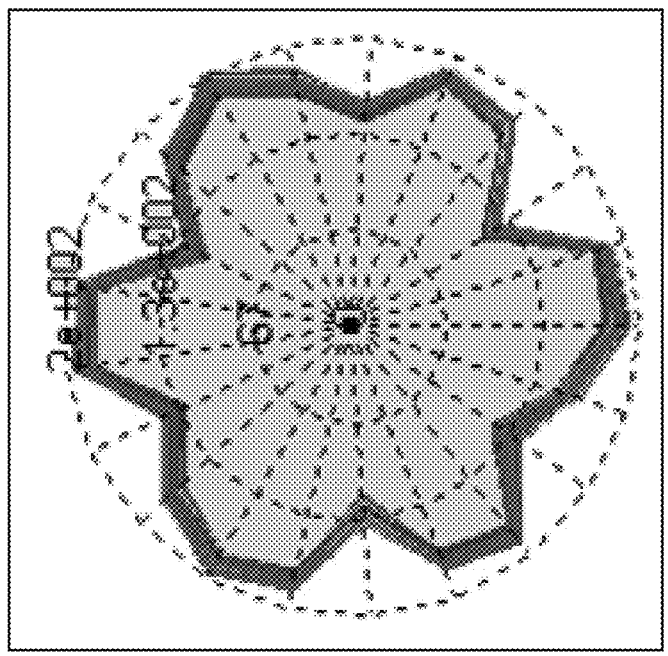
FIG. 3A is a normal profile of thermocouple exhaust data, according to an embodiment of the disclosure.

FIGS. 3A and 3B illustrate two example profiles of thermocouple exhaust data, according to an embodiment of the disclosure. The data may be presented as plots in polar coordinates. An angle coordinate of a point on the plot may correspond to the angle of a temperature sensor from the plurality of temperature sensors. Radius of the point may correspond to temperature data provided by the temperature sensor.

FIG. 3A represents an example normal profile of thermocouple exhaust data for a turbomachine including 6 combustors. The normal profile may correspond to normal operation of the combustors. In the example of FIG. 3A, the normal profile includes 6 peaks that correspond to six combustors of gas turbomachine system 2. The six peaks alternate with six troughs. Overall, six peaks and six troughs may form a normal peak and trough pattern for six combustor turbomachines.

FIG. 3B represents an example abnormal profile of thermocouple exhaust data for a turbomachine including six combustors. Unlike the normal profile of FIG. 3A, the abnormal profile of FIG. 3B misses one peak at area 80. Missing a peak in a peak-trough pattern may indicate an anomaly in operations of combustors of the gas turbomachine system 2.

Figure 4:
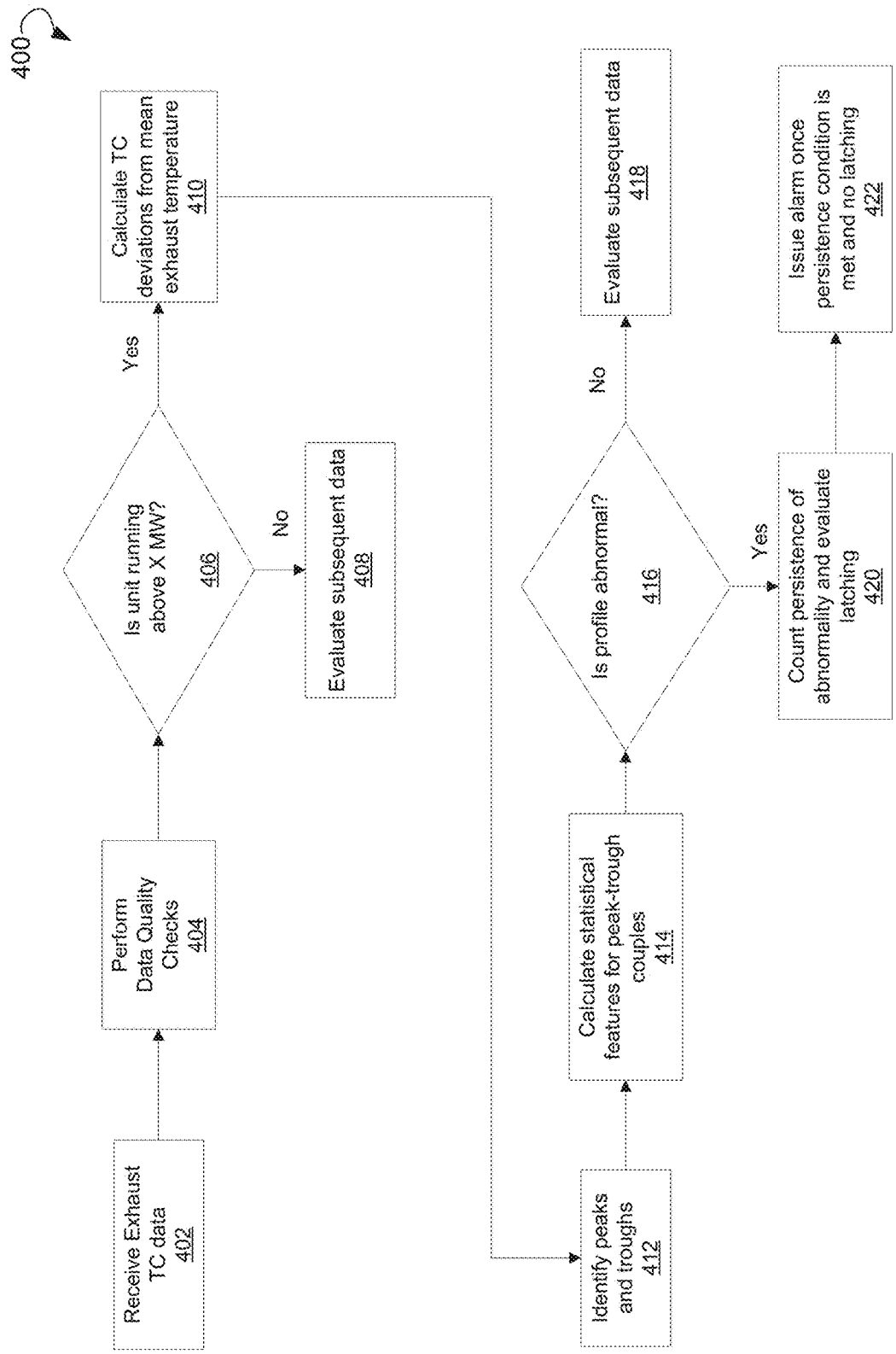
FIG. 4 is a flow chart illustrating an example method of detecting an anomaly in a combustion section of a gas turbine, according to an embodiment of the disclosure.

FIG. 4 is a flow chart showing an example method 400 for detecting an anomaly in a combustion section of a gas turbine, according to an embodiment of the disclosure. The operations of the method 400 may be performed by combustion anomaly detection system 60. The operations of method 400 may be embedded in program instructions 68 of the combustor anomaly detection system 60. The method 400 may analyze thermocouple exhaust data to detect an abnormal peak-trough pattern. In some embodiments of the disclosure, the system 60 is configured to perform processing of the exhaust data one time per minute.

In block 402, combustion anomaly detection system 60 may receive thermocouple (TC) exhaust data from temperature sensors 50. In block 404, the system 60 may perform data quality checks. At decision block 406, the system 60 may determine whether the turbomachine is running above a predetermined load, at which a peak-trough pattern is expected. If the turbomachine is not running above the predetermined load then, in block 408, the system 60 may proceed with evaluating subsequent data (for example, thermocouple exhaust data received in a subsequent minute).

If the turbomachine is running above the predetermined load, then the system 60 may calculate the deviation from mean exhaust temperature for each thermocouple in block 410. In block 412, the system 60 may identify peaks and troughs in exhaust data. In block 414, the system 60 may calculate statistical features (for example, a feature vector) for the peak-trough pairs. The statistical features may include the peak-to-trough temperature difference (delta), mean deviation from all peaks or troughs, minimum peak temperature, maximal peak temperature, minimal trough temperature, maximal trough temperature, maximal peak-to-trough delta, minimal peak-to-trough delta, and so on.

In decision block 416, the system 60 may determine whether the profile corresponding to the thermocouple exhaust data is abnormal. In some embodiments of the disclosure, the determination includes processing the feature vector evaluated at block 414 through a machine learned classification model. It should be appreciated by those skilled in the art, that the type of suitable classification models can include but are not limited to Support Vector Machine (SVM), Artificial Neural Network (ANN), decision tree model, or other classifiers. The model may be trained offline using the feature vectors of both normal exhaust data samples and failure exhaust data samples. By processing the feature vector using the trained model, the system 60 may determine whether there is an abnormal peak-trough pattern in the thermocouple exhaust data. If the profile (peak-trough pattern) is normal, then the system 60 may proceed with evaluating subsequent thermocouple exhaust data in block 418.

If profile is abnormal, system 60 may count the persistence of the abnormality and evaluate the latching of the abnormality. If the abnormal peak-trough pattern is present for a predefined period of time and an alarm has not already been generated during a predefined latch period, an alarm may be triggered for further evaluation and action in block 422.

Figure 5:
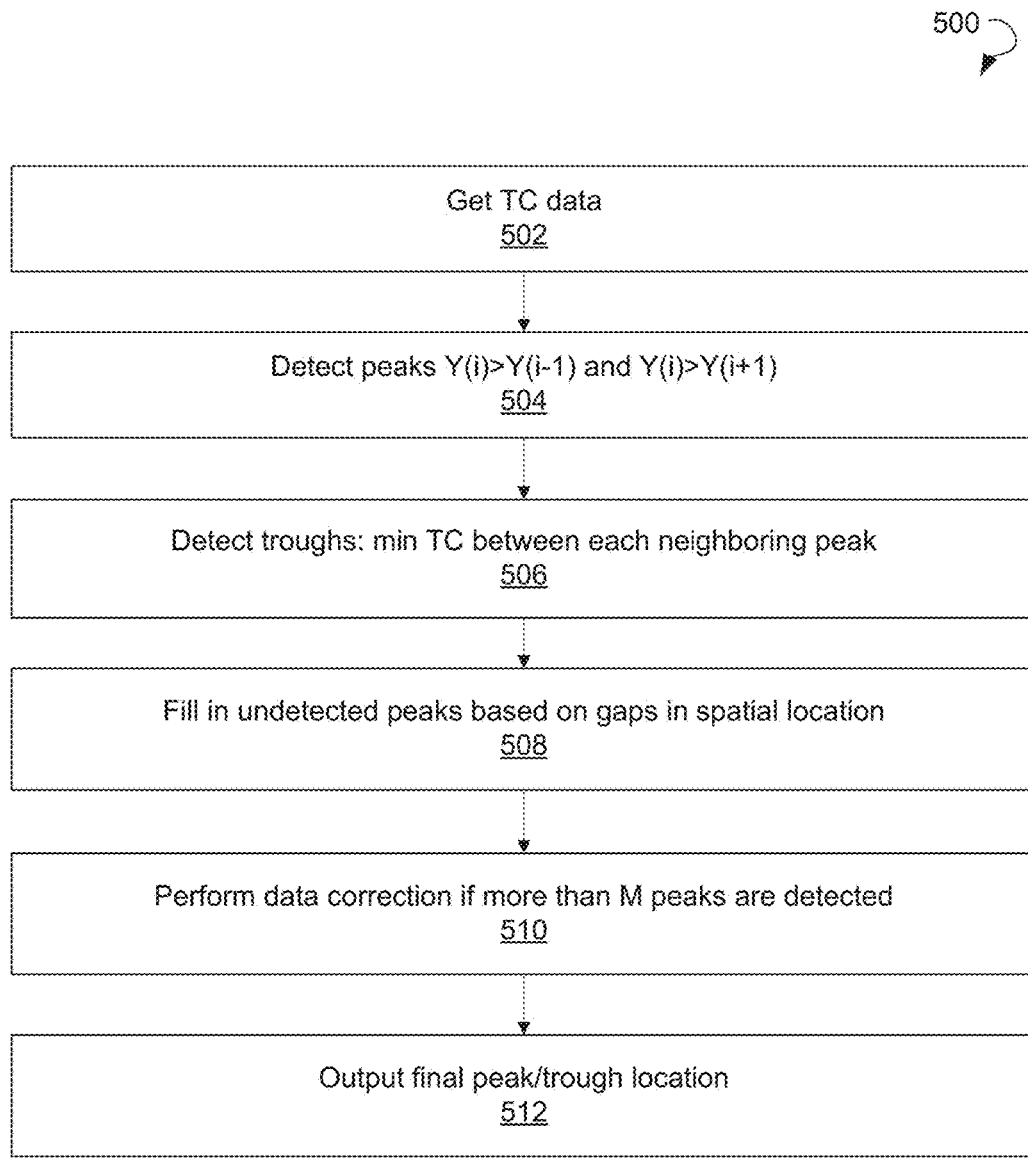
FIG. 5 is a flow chart illustrating an example method for identifying peaks and troughs locations in thermocouple exhaust data, according to an embodiment of the disclosure.

FIG. 5 is a flow chart illustrating an example method 500 for identifying peaks and troughs locations in thermocouple exhaust data, in accordance with an embodiment of the disclosure. The method 500 may provide details of block 412 of the method 400 shown in FIG. 4. In block 502, the method 500 may include receiving thermocouple exhaust data. The thermocouple data may include temperatures $Y(i)$ provided by temperature sensors 50 for a given minute. In block 504, the method may include detecting the locations of peaks. The location of peaks may be defined by condition $Y(i)>Y(i-1)$ and $Y(i)>Y(i+1)$. In block 506, the method 500 may include detecting the location of troughs. Each of the troughs may be defined as the minimal $Y(i)$ between two subsequent peaks. In block 508, the method 500 may include filling in undetected peaks based on gaps in spatial location. In block 510, the method 500 may include performing data correction if more than M peaks are detected, wherein M is the number of combustors in the turbomachine. In block 512, the method 500 may provide for outputting final peak and trough location.

Figure 6:
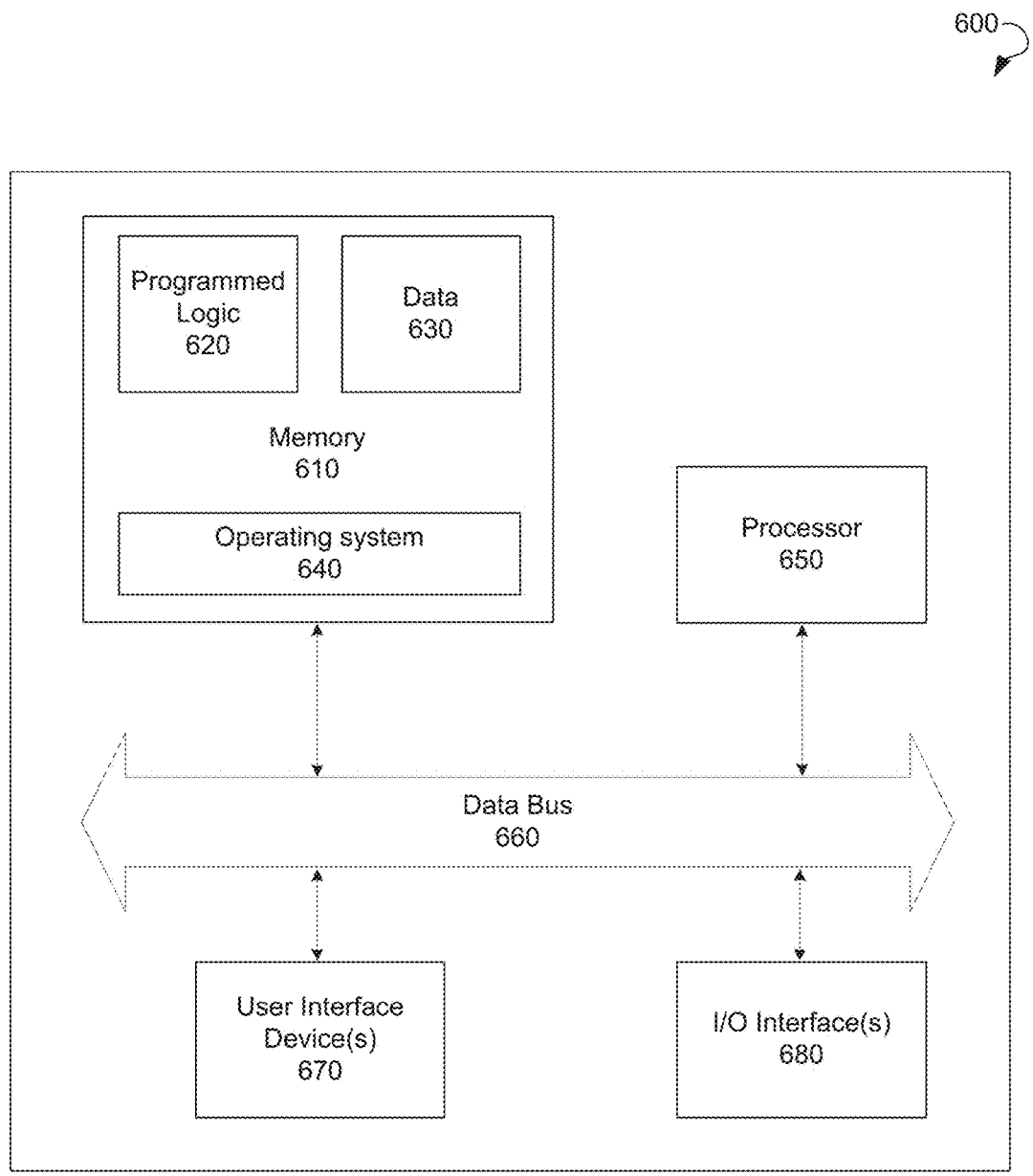
FIG. 6 is a block diagram illustrating an example controller for controlling a gas turbine, according to an embodiment of the disclosure.

FIG. 6 depicts a block diagram illustrating an example controller 600 for detecting an anomaly in a combustion section, in accordance with an embodiment of the disclosure. More specifically, the elements of the controller 600 may be used to run a gas turbine under a plurality of operational conditions while within predetermined combustion operational boundaries, automatically collect operational data associated with the gas turbine while the gas turbine is running, store the operational data, generate a set of constants for one or more predetermined combustion transfer functions based on the operational data, and store the set of constants in the gas turbine combustion control system to be used during the commissioning of the gas turbine. The controller 600 may include a memory 610 that stores programmed logic 620 (e.g., software) and may store data 630, such as operational data associated with the gas turbine, the set of constants, and the like. The memory 610 also may include an operating system 640.

A processor 650 may utilize the operating system 640 to execute the programmed logic 620, and in doing so, may also utilize the data 630. A data bus 660 may provide communication between the memory 610 and the processor 650. Users may interface with the controller 600 via at least one user interface device 670, such as a keyboard, mouse, control panel, or any other device capable of communicating data to and from the controller 600. The controller 600 may be in communication with the gas turbine combustion control system online while operating, as well as in communication with the gas turbine combustion control system offline while not operating, via an input/output (I/O) interface 680. Additionally, it should be appreciated that other external devices or multiple other gas turbines or combustors may be in communication with the controller 600 via the I/O interface 680. In the illustrated embodiment of the disclosure, the controller 600 may be located remotely with respect to the gas turbine; however, it may be co-located or even integrated with the gas turbine. Further, the controller 600 and the programmed logic 620 implemented thereby may include software, hardware, firmware, or any combination thereof. It should also be appreciated that multiple controllers 600 may be used, whereby different features described herein may be executed on one or more different controllers 600.

References are made to block diagrams of systems, methods, apparatuses, and computer program products, according to example embodiments of the disclosure. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above.

Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for detecting an anomaly in a combustion section of a gas turbine, the system comprising:
   a plurality of combustors associated with a combustion section;
   a plurality of thermal sensors disposed at an exhaust section of a gas turbine, wherein the thermal sensors are configured to provide exhaust profile data of the gas turbine;
   a processing circuit communicatively coupled to a memory, the memory storing instructions which when executed by the processing circuit perform operations comprising:
   receiving, from the plurality of thermal sensors, the exhaust profile data of the gas turbine;
   analyzing the exhaust profile data to calculate statistical features associated with a peak-trough pattern;
   determining, using an algorithm or model, that the statistical features are abnormal; and
   in response to the determination, continuing processing of the exhaust profile data for a predetermined period of time; and
   reporting an anomaly in the combustion section of the gas turbine when the statistical features remain abnormal for the predetermined period of time.

2. The system of claim 1, wherein the algorithm or model is based on historical exhaust profile data, the historical exhaust profile data including normal data samples and false data samples.

3. The system of claim 1, wherein the thermal sensors are positioned radially around an exhaust component associated with the turbine.

4. The system of claim 1, wherein the sensors are disposed in an evenly spaced array.

5. The system of claim 1, wherein the exhaust profile data includes a plurality of peak and trough couples, each peak and trough couple of the plurality of peaks and troughs corresponding to at least one combustor of the plurality of the combustors.

6. The system of claim 5, wherein the analyzing includes evaluating each peak and trough couple relative to an expected peak-trough pattern.

7. The system of claim 5, wherein analyzing includes:
   identifying, based on the exhaust profile data, a peak and trough couple associated with each thermal sensor; and
   calculating the statistical features for each peak and trough couple.

8. The system of claim 1, wherein the exhaust profile data includes statistical features associated with the plurality of thermal sensors, the statistical features including at least one of the following: a minimum peak temperature, a maximum peak temperature, a minimum trough temperature, a maximum trough temperature, a minimum peak-to-trough delta, and a maximum peak-to-trough delta.

9. The system of claim 1, wherein the determining that the statistical features are abnormal includes creating a feature vector based at least on the statistical features and processing the feature vector through a classification model.

10. The system of claim 1, further comprising prior to the analyzing:
    determining a quality of the exhaust profile data versus a predetermined quality level; and
    in response to the determining that the quality is below a predetermined quality level, adjusting the exhaust profile data.

11. The system of claim 1, wherein the analyzing is performed after the gas turbine is operating above a predetermined load.

12. The system of claim 1, further comprising issuing an alarm based at least in part on the detecting of the anomaly in the combustion section of the gas turbine.

13. The system of claim 12, wherein the alarm triggers at least one of the following: a further evaluation and a responsive action.

14. A method for detecting an anomaly in a combustion section of a gas turbine, the method comprising:
    receiving, from a plurality of thermal sensors disposed at an exhaust section of a gas turbine, exhaust profile data of the gas turbine;
    analyzing the exhaust profile data to calculate statistical features associated with a peak-trough pattern;
    determining, using an algorithm or model, that the statistical features are abnormal; and
    in response to the determination, continuing processing of the exhaust profile data for a predetermined period of time; and
    reporting an anomaly in a combustion section of the gas turbine when the statistical features remain abnormal for the predetermined period of time.

15. The method of claim 14, wherein: the algorithm or model is based on historical exhaust profile data, the historical exhaust profile data including normal data samples and false data samples.

16. The method of claim 14, wherein the thermal sensors are: positioned radially around an exhaust component associated with the gas turbine and disposed in an evenly spaced array.

17. The method of claim 14, wherein the exhaust profile data includes a plurality of peak and trough couples, each peak and trough couple of the plurality of peaks and troughs corresponding to at least one combustor of the plurality of combustors.

18. The method of claim 17, wherein the calculating the statistical features includes:
    identifying, based on the exhaust profile data, a peak and trough couple associated with each thermal sensor; and
    calculating statistical features for each peak and trough couple.

19. The method of claim 14, wherein the determining that the statistical features are abnormal includes creating a feature vector based at least on the statistical features and processing the feature vector through a classification model.

20. A non-transitory computer-readable medium having stored instructions, which when executed by at least one processor, perform operations comprising:
    receiving, from a plurality of thermal sensors disposed at an exhaust section of a gas turbine, exhaust profile data of the gas turbine;

analyzing the exhaust profile data to calculate statistical features associated with a peak-trough pattern;
determining, using an algorithm or model, that the statistical features are abnormal; and
in response to the determination, continuing processing of the exhaust profile data for a predetermined period of time; and
reporting the anomaly in a combustion section of a gas turbine when the statistical features remain abnormal for the predetermined period of time.

* * * * *